May 7, 1968   F. T. SMITH   3,381,803
RECLAIMER DRIVE
Filed June 13, 1966   3 Sheets-Sheet 1
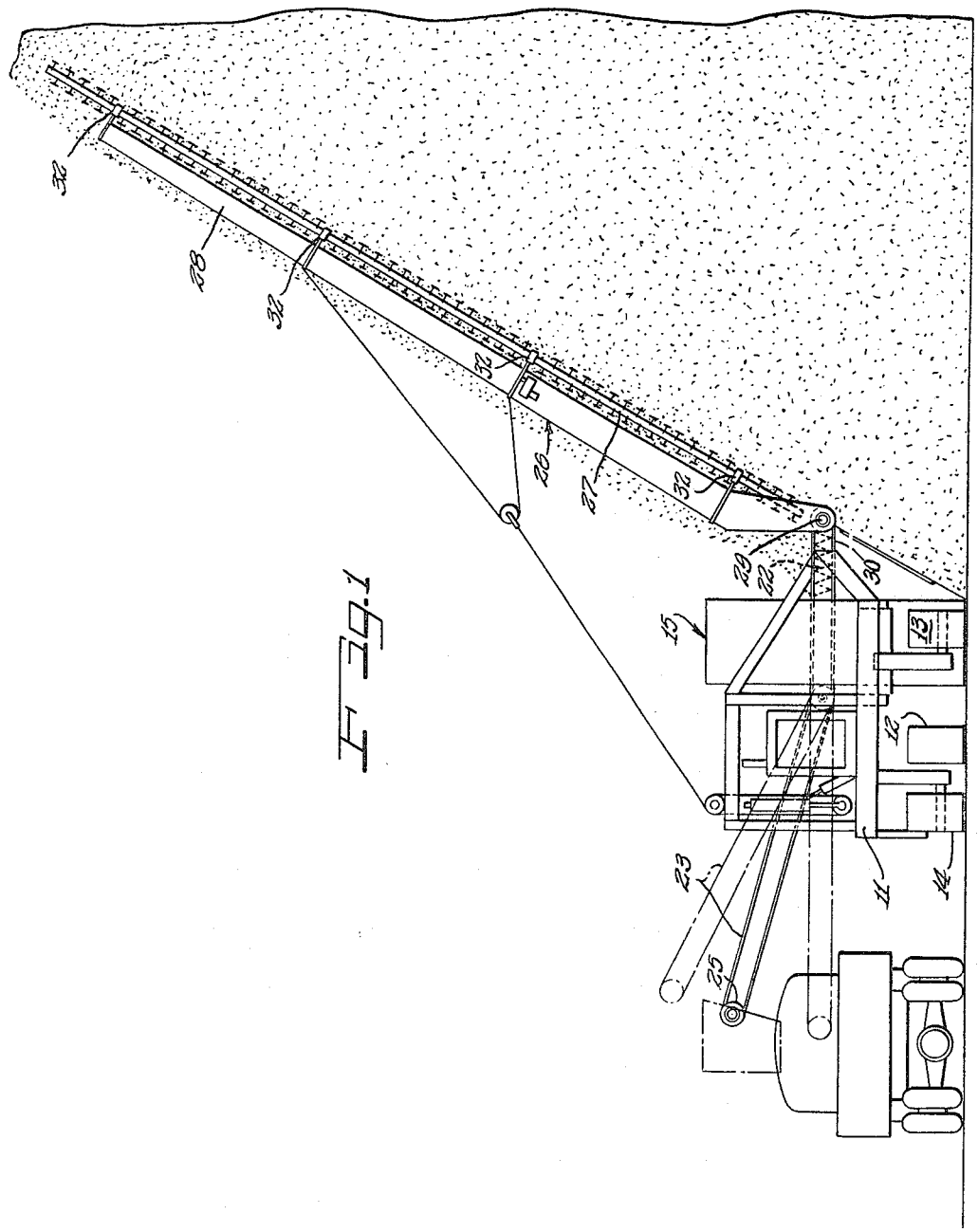
INVENTOR.
Fred T. Smith
Hill, Sherman, Meroni, Gross & Simpson ATTORNEYS May 7, 1968 F. T. SMITH 3,381,803
RECLAIMER DRIVE
Filed June 13, 1966 3 Sheets-Sheet 2
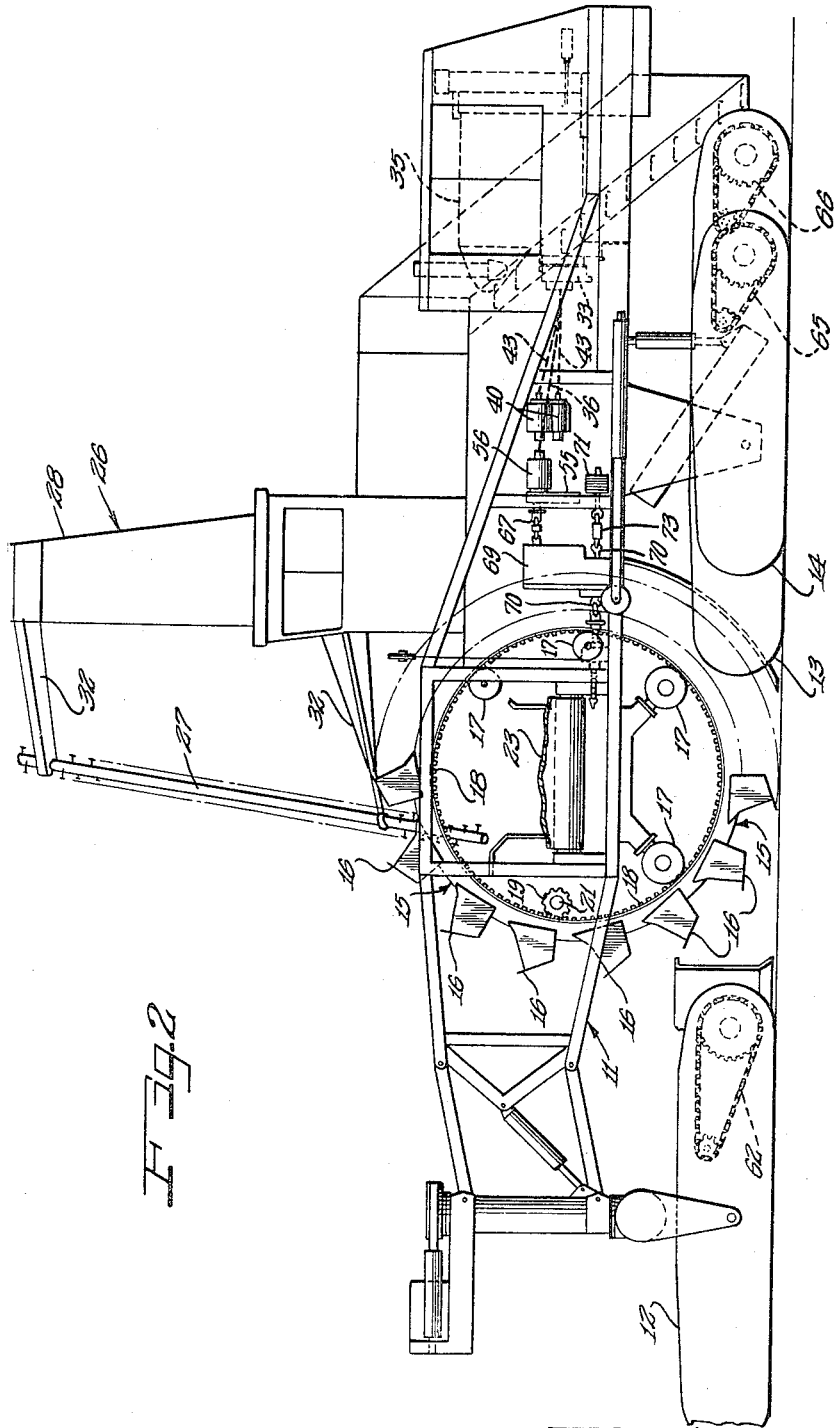
INVENTOR.
Fred T. Smith
BY  ATTORNEYS

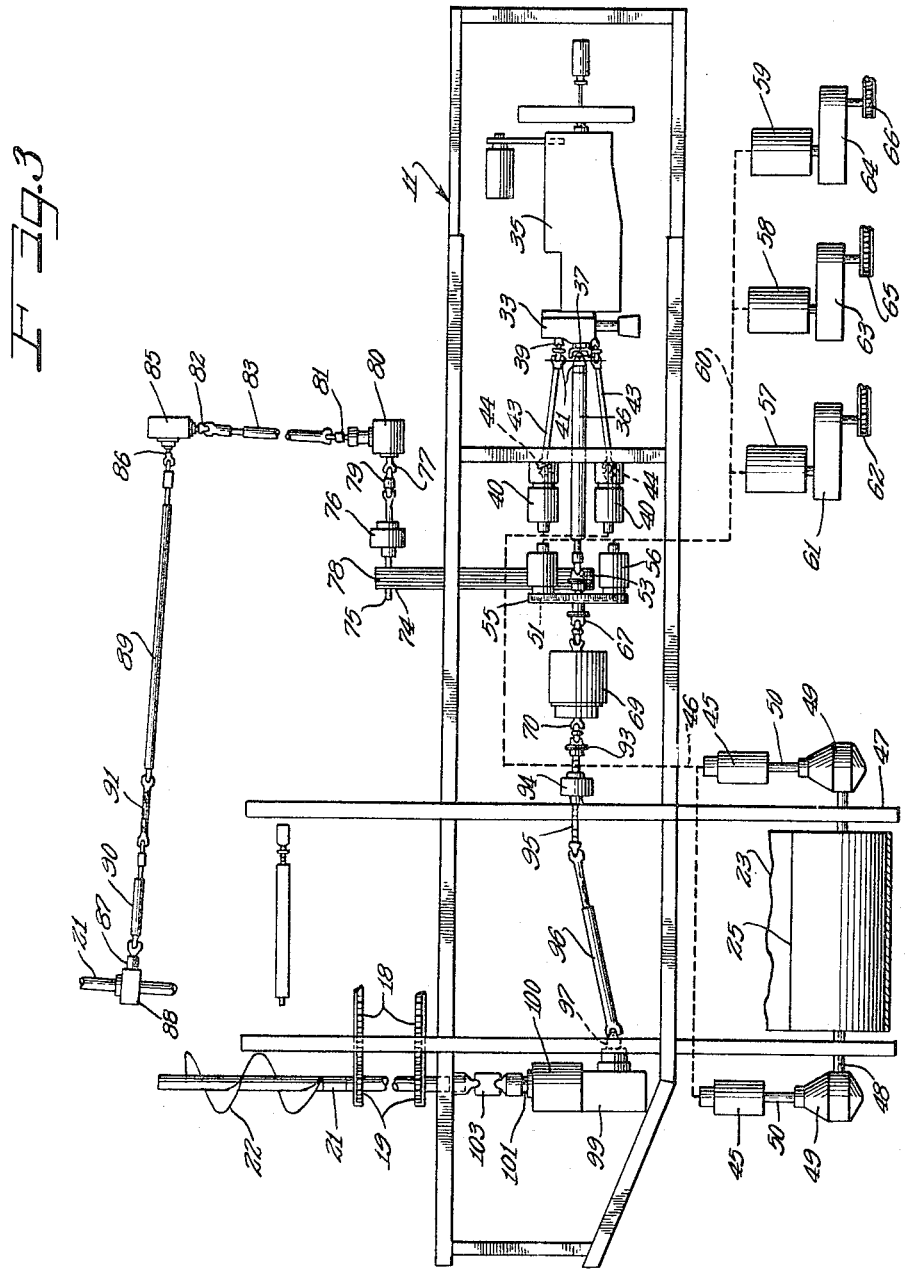

United States Patent Office 3,381,803
Patented May 7, 1968

3,381,803
RECLAIMER DRIVE
Fred T. Smith, Aurora, Ill., assignor to Barber-Greene Company, Aurora, Ill., a corporation of Illinois
Filed June 13, 1966, Ser. No. 557,020
11 Claims. (Cl. 198—233)

ABSTRACT OF THE DISCLOSURE

This invention relates to improvements in mobile reclaimers for flowing loose material from piles for loading, and more particularly relates to an improved form of power divider drive mechanism for the reclaimer.

---

Heretofore, reclaimers have been used for converting a pile of material into loose material for loading and for loading the loose material onto a suitable material carrying means such as a conveyor, truck and the like. Such reclaimers have comprised a bucket wheel rotatable about a horizontal axis extending generally perpendicular of the pile and advanced into and along the pile by a plurality of spaced continuous traction tread devices, supporting the reclaimer and feeding the bucket into the material loosened by the cutter bar of a slope cutter, movable along the pile at the general angle of slope of the pile. The conveyor, bucket wheel, slope cutter and continuous traction tread devices have all been driven from a common source of power in the form of an internal combustion engine.

In such reclaimers, the consistency of the material being loaded by the bucket and loosened by the slope cutter frequently varies with a resultant variation in torque load on the bucket wheel or slope cutter, which load may be such as to stall the bucket wheel or slope cutter.

It has been found to be extremely advantageous to supply the bucket wheel with the required torque to enable it to continuously load loose material of varying consistencies, and to divide the power from the bucket wheel to the continuous traction tread devices and the slope cutter, to vary the power supplied to the continuous traction tread devices and slope cutter as the power required to rotate the bucket wheel increases, to thereby advance the bucket wheel up to its maximum pick up ability and to stop advance of the bucket wheel when the load on the wheel is in excess of its loading capacity, or where the wheel may come into contact with an immovable object and stall.

It is further necessary that the conveyor continually operate at sufficient capacity to carry away the loose material loaded onto it by the bucket wheel and loosened from the pile and that the speed of operation of the conveyor be constant relative to the speed of operation of the bucket wheel.

Accordingly, one of the principal objects of the present invention is to provide a simple and improved power divider drive connection from a source of power for the reclaimer apparatus, giving an automatic torque build up to the bucket wheel when required and reducing the speed of travel of the continuous traction tread devices feeding the bucket wheel along the pile as torque on the bucket wheel builds up.

A further object of the invention is to improve upon the drives for loaders for loose material and the like, reclaiming loose material from a pile, in which a bucket wheel, continuous traction tread devices and pile cutter are all driven from a common torque converter driven from a source of power for the reclaimer, and the drive to the conveyor is directly from the source of power independently of the torque converter.

A still further object of the invention is to provide an improved form of power divider drive for a reclaimer, loading loose material from a pile and advanced along the pile by spaced continuous traction tread devices, and having a conveyor conveying the loose material for transportation and a bucket wheel for loading the loose material onto the conveyor, in which the conveyor and continuous traction tread devices are driven from independent fluid motors, in which a torque converter driven from the source of power drives the pump supplying fluid under pressure to the fluid pressure operated motor driving the continuous traction tread devices, and also drives the bucket wheel and in which the source of supply fluid under pressure to the conveyor drive motor is a separate pump driven directly from the source of power independently of the torque converter.

These and other objects of the invention will appear from time to time as the following specification proceeds and with reference to the accompanying drawings wherein:

FIGURE 1 is a generally diagrammatic view of a reclaimer constructed in accordance with the principles of the present invention showing the reclaimer in operation for loading loose material from a pile onto a truck and the like;

FIGURE 2 is a diagrammatic view in side elevation of the reclaimer shown in FIGURE 1 with certain parts in section and certain other parts broken away and removed; and FIGURE 3 is a generally diagrammatic plan view of the reclaimer, with certain parts broken away, in order to show the drive to the operative parts of the reclaimer.

In the embodiment of the invention illustrated in the drawings, I have shown in FIGURES 1 and 2 a reclaimer 10 of a type like that shown and described in my application Ser. No. 504,739, filed Oct. 24, 1965 and entitled "Reclaimer." The reclaimer, therefore, need not be shown and described in detail herein.

The reclaimer 10 generally includes a main frame 11 supported on three spaced continuous traction tread devices including a front steering traction tread device 12 and two laterally spaced inner and outer rearwardly spaced continuous traction tread devices 13 and 14 respectively, tramming the apparatus along the ground and feeding a bucket wheel 15 along the edge of a pile of loose material, as shown in FIGURE 1.

The bucket wheel 15 has a plurality of buckets 16 extending generally radially therefrom and is of an annular form supported on a series of spaced rollers 17 and having internal gears 18 at each side thereof, shown as being driven by pinions 19 on a horizontal drive shaft 21. The drive shaft 21 extends laterally of the bucket wheel 15 toward the pile to be loaded, and has a scroll 22 thereon, progressing the material in the pile toward the buckets 16.

The machine also includes a conveyor 23 extending through the bucket wheel 15. The conveyor 23 is shown as being a conventional form of belt conveyor turning about a drive roller 25 at its discharge end and driven thereby.

The machine also includes a slope cutter 26 movable along the sloping face of the pile of material for cutting into and freeing the material to move downwardly along the slope thereof to be picked up by the bucket wheel 15. The slope cutter 26 includes a slope cutter bar 27 extending along an upwardly inclined boom 28, inclined at the general angle of the slope of the pile. The boom 28 is pivotally mounted on the main frame 11 for movement about an axis extending longitudinally thereof, on a shaft 29, mounted in an outboard support 30, also forming a support for the frame structure of the conveyor 23, at the receiving end thereof.

The rotary cutter bar 27 is rotatably mounted on the boom 28 in laterally spaced relation with respect thereto on bearing supports 32, 32, leading the boom 28, to support said rotary cutter bar to be advanced along the pile of material in advance of said boom as the machine advances along the pile of material being reclaimed.

Referring now in particular to the drive to the conveyor 23, the continuous traction tread devices 12, 13 and 14, the bucket wheel 15 and the cutter bar 27 and certain novel features of the invention, a torque converter 33 is diagrammatically shown as being directly connected with and driven from a conventional internal combustion engine 35. The torque converter 33 may be a conventional form of hydraulic torque converter. A suitable form of torque converter may be like that manufactured and sold by Twin Disk Clutch Co. and no part of the present invention so not herein shown or described further. The torque converter 33 drives a main drive shaft 36 through a universal coupling 37. Drive connections by-passing the torque converter are also provided for drive coupling members 39, driven directly from the internal combustion engine 35 and thereby unaffected by torque loads on said torque converter. The drive couplings 39 serve to drive pumps 40 through universal couplings 41 and drive shafts 43 having drive connections with the pumps 40 through universal couplings 44, diagrammatically shown in FIGURE 3. While two pumps 40 are shown herein, it should be understood that two pumps need not necessarily be used and one large capacity pump may take the place of the two pumps if desired.

The pumps 40 may be conventional hydraulic pumps, and may be variable displacement types of pumps having an overcenter stroke arrangement for pumping fluid in opposite directions and connected to drive hydraulic motors 45 through pressure lines 46 under the control of suitable hydraulic control valves (not shown) operable to effect operation of the motors 45 in reverse directions and at infinitely variable speeds in both directions of operation. The control valves and fluid pressure circuit may be of a conventional form of closed loop system for effecting reversal of the conveyor to free the conveyor from large lumps and to drive the conveyor at infinitely variable speeds in each direction of operation. The fluid pressure system is no part of the present invention so need not herein be shown or described further. The motors 45 are mounted on opposite sides of a frame structure 47 for the conveyor 23 and have drive connection with opposite ends of a drive shaft 48, for the conveyor drive roller 25, through angle drives (not shown) contained in gear housings 49, mounted on opposite sides of the frame structure 47. Individual drive shafts 50 drivingly connect the motors 45 with angle reduction gear drives in the angle gearboxes 49 in a conventional manner. The conveyor 23 may thus be driven independently of the torque converter 33 directly from the internal combustion engine 35 at a constant speed varying only with engine speed. The motors 45 may also be reversed to move the conveyor back and fourth where large lumps discharged onto the conveyor may foul the conveyor, and it is necessary to free the conveyor.

The drive shaft 36 has drive connection with transmission gearing 51 through a universal coupling 53. The transmission gearing 51 is housed within a casing 55, forming a support for two pumps 56, driven from said transmission gearing 51 through the torque converter 33. The pumps 56 serve to supply fluid under pressure to three fluid pressure operated motors 57, 58 and 59 connected in parallel by a fluid pressure line 60. Suitable hydraulic control valves (not shown) are provided in the fluid pressure line 60 to vary the output from the pumps 56. The hydraulic pumps 56 are conventional forms of variable displacement types of pumps, which may have an overcenter stroke arrangement so the pumps can pump hydraulic fluid in opposite directions, and the output from the two pumps can be infinitely varied from zero in either direction and connected to the motors 57, 58 and 59 in a conventional form of closed loop fluid pressure system. The three motors 57, 58 and 59 being connected in parallel and the output from the two pumps 56, 56 being capable of being infinitely varied from zero in either direction, the continuous traction tread devices 12, 13 and 14, driven from the respective hydraulic motors 57, 58 and 59 can be driven at any desired speed in either direction of rotation up to a maximum speed determined by the maximum output of the pumps. The pumps 56 like the pumps 40 need not necessarily be multiple pumps, but may be a single pump, if desired.

The pump 57 has drive connection with a transmission 61, which may be a change speed transmission of a conventional form and having a low feeding or digging speed and a higher tramming speed used for tramming the apparatus along a roadway from place to place. A chain and sprocket drive 62 is shown as being provided to drive the continuous traction tread device 12 from the transmission 61. In a like manner plural speed transmissions 63 and 64 are driven from the respective hydraulic motors 58 and 59 and drive the respective continuous traction tread devices 13 and 14 through chain and sprocket drives 65 and 66 respectively.

The continuous traction tread devices may thus be driven under the control of the torque converter 33 and will automatically speed up or slow down as the load on the torque conveyor 33 varies, which may be caused by increased digging loads on the bucket wheel 15 or on the pile cutter bar 27 or by increasing grades, as where the reclaimer is traveling upwardly along a grade.

The universal coupling 53 driving the transmission gearing 51 in the casing 55, also drives a coaxial universal coupling 67, on the opposite side of the casing 55 from the universal coupling 53, which serves to drive a change speed transmission 69, which may be a conventional form of change speed geared transmission and is no part of the present invention so need not herein be shown or described further. The transmission 69 has an output shaft 70, shown in FIGURE 3 as forming a drive to the shaft 21, and the digger wheel 15 and scroll 22 driven by said shaft. The output shaft 70 also extends rearwardly of the transmission 69 (FIGURE 2) and serves as a drive member for a drive sheave 71, serving as a drive member for the cutter bar 27 of the slope cutter 26. The drive sheave 71 may be a multiple V-belt type of drive sheave of a conventional form, and is shown as being driven from the shaft 70 through a universal coupling 73. The drive sheave 71 in turn drives a drive sheave 74 on a parallel shaft 75 through V-belts 78.

The drive shaft 75 is suitably journalled in the main frame 11 and serves as a drive member for a conventional form of overload slip clutch 76 coaxial with the drive shaft 75. The overload slip clutch 76 in turn drives a coaxial drive shaft 77 through a universal coupling 79. The shaft 77 is journalled in and extends within a housing 80 forming a bearing housing for suitable angle gearing (not shown) driving a drive shaft 81, shown as being at right angles to the drive shaft 77. The drive shaft 81 in turn drives an outwardly spaced drive shaft 82 through an extensible universal drive coupling 83, of a conventional form. The drive shaft 82 is suitably journalled in a casing 85 containing angle drive gearing, which may be worm and worm gearing and drives a shaft 86 at right angles to the shaft 82. The shaft 86 in turn forms a drive member for a shaft 87 journalled in a drive housing 88 for the lower end portion of the cutter bar 27. The drive from the shaft 86 to the shaft 87 is shown as comprising spaced universal coupling shafts 89 and 90 connected at their adjacent ends by a coupling 91 suitably journalled in the boom 28 in a conventional manner. The housing for the end of the cutter bar 88 contains suitable right angled drive gearing (not shown) for driving the slope cutter bar 27 in a conventional manner. This drive gearing is not herein shown or described since it may be of various forms, and is no part of the present invention.

The drive from the shaft 70 to the bucket wheel 15 and scroll 22 includes a universal coupling 93 driving a coaxial overload slip clutch 94, having driving connection with a coaxial drive shaft 95, suitably journalled in the main frame 11. The drive shaft 95 in turn drives an extensible universal coupling shaft 96, connected with a drive shaft 97 journalled in a housing 99. The housing 99 may contain right angled drive gearing, such as worm and worm gearing (not shown) and is connected with a speed reducer housing 100, containing conventional speed reducer gearing (not shown) driven from the right angled gearing in the housing 99. The speed reducer gearing contained within the housing 100 is not herein shown or described in detail since it forms no part of the present invention.

The speed reducer gearing contained within the housing 100 drives an output shaft 101 having driving connection with the drive shaft 21 through a universal coupling 103. The drive shaft 21 is suitably journalled in the main frame 11 and drives the bucket wheel through the pinions 19 meshing with the internal gears 18 as has previously been described.

It may be seen from the foregoing that the slope cutter bar 27 and bucket wheel 15 are simultaneously driven under the control of the torque converter 33 and that increased loads on the bucket wheel, tending to slow down or stall the bucket wheel, will also effect the slowing down or stalling of the cutter bar 27 of the slope cutter 26, and the slowing down of the continuous traction tread devices 12, 13 and 14.

Where the loads on the bucket wheel are great enough to stall the wheel as when the loads are in excess of the torque converter output, the bucket wheel 11, cutter bar 27 and the pile cutter 26 and continuous traction devices will all stop because the output from the torque converter 33 stops, as well as the input to the transmission 69.

Since, however, the pumps 40 are driven directly from the engine 35 and bypass the torque converter 33, the conveyor 33 will continue to operate and clear itself of material thereon and maintain itself clear, as material may tend to drop thereonto when attempting to free the bucket wheel.

As the load on the bucket wheel 15 increases, the output from the torque converter will decrease, and the feed of the bucket wheel into the material will also decrease. This decreased feed will relieve the load on the torque converter 33. The torque driving the bucket wheel 15 will thereby increase and give the bucket wheel 15 the opportunity to dig through the harder material and free itself without stopping the machine or without attention from the operator of the machine. When the torque driving the bucket wheel 15 becomes normal the speed of travel of the reclaimer will automatically pick up and the continuous traction tread devices will advance the bucket wheel along the pile at a normal rate of speed.

With the particular drive shown the transmission 69 driven through the torque converter 33 may be shifted when the apparatus is in operation and automatic torque build up is provided, which increases where required and the bucket wheel 15 and pile cutter bar 27 are protected, when either the bucket wheel or the slope cutter bar may become fouled.

It may further be seen that with the drive transmission of the present invention, the torque converter prevents stalling of the engine upon excess loads on the bucket wheel and that a power divider drive has been provided from the torque conveyor to the bucket wheel, pile cutter bar 27 and continuous traction tread devices 12, 13 and 14 which will allow one element to take substantially the full torque output from the internal combustion engine where required. Also where the digging and picking up of the loose material requires an excess of power, this excess power is transmitted to the bucket wheel, while the speed of feeding the bucket wheel into the loose material decreases, and automatically increases when the heavy loading conditions are surmounted and the machine may continue its digging and loading in a normal manner. The conveyor 23 further is in operation at the required speed at all times, regardless of the power requirements for digging and the torque transmitted by the torque converter.

While I have herein shown and described one form in which the invention may be embodiment, it may readily be understood that various variations and modifications in the invention may be attained without departing from the spirit and scope of the novel concepts thereof.

I claim:

1. In an apparatus for dislodging and loading material,
 a frame,
 continuous traction tread devices supporting and propelling said frame,
 a conveyor,
 a bucket wheel rotatably journalled on said frame for picking up and loading material onto said conveyor,
 a source of power,
 the improvements comprising:
  drive mechanism driven from said source of power for driving said bucket wheel and continuous traction tread devices and individually distributing separate automatic torque builds ups to said bucket wheel said continuous traction tread devices as one of said devices becomes overloaded,
  and other drive connections from said source of power continuously driving said conveyor at a rate of speed independent of the torque loads on said bucket wheel and continuous traction tread devices.

2. The structure of claim 1,
wherein the drive mechanism for driving said bucket wheel and continuous traction tread devices comprise a torque converter and independent drive connections from said torque converter to said bucket wheel and to said continuous traction tread devices.

3. The structure of claim 2,
wherein the drive connections from the torque converter to the bucket wheel are direct drive connections,
wherein the drive connections to said continuous traction tread devices are individual motors for driving each traction tread device,
and wherein means are provided driven from said torque converter for supplying the power to individually drive said motors.

4. The structure of claim 1,
wherein the drive connection to said bucket wheel and to said laterally spaced continuous traction tread devices comprises:
 a torque converter driven from said source of power,
 a geared drive connection from said torque converter to said bucket wheel,
 individual fluid operated motors for driving said continuous traction tread devices,
 and at least one fluid pump driven from said torque converter and supplying fluid under pressure to drive said motors.

5. The structure of claim 4,
wherein the fluid motors are connected in parallel and are capable of being driven at infinitely variable speeds in reverse directions.

6. The structure of claim 4,
wherein the drive to the conveyor comprises a fluid operated motor and pump, supplying fluid under pressure to said motor and driven directly from the source of power,
and wherein the fluid motor is reversible and capable of being driven at infinitely variable speeds to enable the conveyor to be freed where large lumps are encountered.

7. An apparatus for dislodging and loading material comprising:
 a frame, a plurality of spaced continuous traction tread devices supporting and propelling said frame, a slope cutter including a boom pivoted to said frame for movement along the slope of a pile and having a rotary cutter bar supported thereon and extending therealong, a conveyor extending along said frame transversely of the pile of material, a bucket wheel rotatably mounted on said frame for movement about a horizontal axis extending longitudinally of the axis of said conveyor and picking up the material and loading the same onto said conveyor, an internal combustion engine forming a source of power for said continuous traction tread devices, said cutter bar, said bucket wheel and conveyor, a torque converter driven by said engine, independent drive connections from said torque converter to said bucket wheel, cutter bar and continuous traction tread devices, and a continuous drive connection directly driven from said engine for driving said conveyor at a constant speed independently of the drive to said bucket wheel, cutter bar and conveyor.

8. The structure of claim 7, wherein the drive connections to said cutter bar and bucket wheel are geared drive connections driven from said torque converter, and wherein the drive connections to said traction tread devices comprise individual fluid opreated motors for each traction tread device, and a pump driven by said torque converter and supplying fluid under pressure to drive said motors.

9. The structure of claim 8, wherein the drive to said conveyor comprises a fluid pressure operated motor and a pump driven directly from said internal combustion engine independently of said torque converter and supplying fluid under pressure to drive said motor.

10. The structure of claim 9, wherein the pump and motors for driving said conveyor and said continuous traction tread devices are reversible and independently variable, for driving said conveyor and said continuous traction tread devices independently of each other at reversible infinitely variable speeds.

11. The structure of claim 8, wherein the bucket wheel is supported for advancing movement along the edge of the pile of loose material, wherein the continuous traction tread devices include two traction tread devices disposed rearwardly of the bucket wheel and one advance continuous traction tread device disposed forwardly of the bucket wheel and spaced laterally outwardly therefrom, and wherein said continuous traction tread devices advance the bucket wheel along the edge of the pile of loose material in accordance with the load on the bucket wheel.

References Cited

UNITED STATES PATENTS 3,226,856   1/1966   Penote _____ 37—97

GERALD M. FORLENZA, *Primary Examiner.*

F. E. WERNER, *Assistant Examiner.*